United States Patent
Adomat et al.

(10) Patent No.: US 10,334,234 B2
(45) Date of Patent: Jun. 25, 2019

(54) STEREO CAMERA FOR VEHICLES

(71) Applicant: Conti Temic microelectronic GmbH, Nuremberg (DE)

(72) Inventors: Rolf Adomat, Eriskirch (DE); Thomas Fechner, Wasserburg (DE); Dieter Kroekel, Eriskirch (DE); Gerhard Mueller, Bad Waldsee (DE); Martin Punke, Hergensweiler (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 44 days.

(21) Appl. No.: 15/517,057

(22) PCT Filed: Sep. 15, 2015

(86) PCT No.: PCT/DE2015/200457
§ 371 (c)(1),
(2) Date: Apr. 5, 2017

(87) PCT Pub. No.: WO2016/055060
PCT Pub. Date: Apr. 14, 2016

(65) Prior Publication Data
US 2017/0310952 A1     Oct. 26, 2017

(30) Foreign Application Priority Data
Oct. 10, 2014     (DE) .......................... 10 2014 220 585

(51) Int. Cl.
*B60R 11/04*     (2006.01)
*H04N 13/296*     (2018.01)
(Continued)

(52) U.S. Cl.
CPC ........... *H04N 13/296* (2018.05); *G02B 13/06* (2013.01); *H04N 5/2353* (2013.01);
(Continued)

(58) Field of Classification Search
CPC ......... G02B 13/06; H04N 13/02; H04N 5/235
See application file for complete search history.

(56) References Cited

U.S. PATENT DOCUMENTS 5,481,257 A * 1/1996 Brubaker ............... A63H 30/04
340/12.55
5,999,657 A * 12/1999 Yasuhiko ............. H04N 9/8047
358/296

(Continued)

FOREIGN PATENT DOCUMENTS

| CN | 101088027 A | 12/2007 |
| CN | 103472569 A | 12/2013 |
| DE | 102004061998 | 7/2006 |

OTHER PUBLICATIONS

Cultural heritage omni-stereo panoramas for immersive cultural analytics; 2013—Smith et al (Year: 2013).*

(Continued)

*Primary Examiner* — Luis Perez-Fuentes
(74) *Attorney, Agent, or Firm* — W. F. Fasse (57) ABSTRACT

A stereo camera (1) for a vehicle includes a first camera (1.1), which has a first image sensor (1.11) and the camera field of vision (S1) of which has a first opening angle ($\alpha 1$), and a second camera (1.2), which has a second image sensor (1.21) and the camera field of vision (S2) of which has a second opening angle ($\alpha 2$). The second opening angle ($\alpha 2$) is greater than the first opening angle ($\alpha 1$). The first camera (1.1) has a first lens optical unit (1.12) and the second camera (1.2) has a second lens optical unit (1.22), which both have an angular resolution that is higher in a central region (Z1, Z2) of the field of vision (S1, S2) lying in the angular range ($\alpha 11$, $\alpha 21$) around the optical axis (O1) than outside of the central region. The cameras are arranged so that the fields of vision (S1, S2) overlap.

19 Claims, 3 Drawing Sheets

(51) Int. Cl.
*G02B 13/06* (2006.01)
*H04N 13/25* (2018.01)
*H04N 5/235* (2006.01)
*H04N 13/239* (2018.01)
*B60R 11/00* (2006.01)

(52) U.S. Cl.
CPC .......... *H04N 13/239* (2018.05); *H04N 13/25* (2018.05); *B60R 11/04* (2013.01); *B60R 2011/0026* (2013.01)

(56) References Cited

U.S. PATENT DOCUMENTS

| | | | | |
|---|---|---|---|---|
| 7,106,365 | B1* | 9/2006 | Sogawa | B60R 1/00 348/222.1 |
| 8,305,431 | B2* | 11/2012 | Robert | G06T 7/97 348/47 |
| 8,743,202 | B2 | 6/2014 | Schick et al. | |
| 9,837,052 | B2* | 12/2017 | Deering | G02B 27/0172 |
| 9,908,482 | B1* | 3/2018 | Falstrup | B60R 11/04 |
| 2010/0097444 | A1* | 4/2010 | Lablans | G03B 35/00 348/46 |
| 2011/0069148 | A1* | 3/2011 | Jones | H04N 5/232 348/36 |
| 2011/0261166 | A1* | 10/2011 | Olazaran | H04N 13/239 348/47 |
| 2013/0120538 | A1 | 5/2013 | Shin et al. | |
| 2013/0188009 | A1* | 7/2013 | Wagatsuma | A61B 6/025 348/36 |
| 2014/0198184 | A1 | 7/2014 | Stein et al. | |
| 2016/0044284 | A1* | 2/2016 | Goseberg | H04N 5/23238 348/148 |
| 2017/0310952 | A1* | 10/2017 | Adomat | G02B 13/06 |

OTHER PUBLICATIONS

Estimation of Image Rotation Angle Using Interpolation; 2010—Wei et al. (Year: 2010).*
Google Search for NPL—2019. (Year: 2019).*
International Search Report of the International Searching Authority for International Application PCT/DE2015/200457, dated Feb. 8, 2016, 3 pages, European Patent Office, HV Rijswijk, Netherlands.
PCT International Preliminary Report on Patentability including English Translation of PCT Written Opinion of the International Searching Authority for International Application PCT/DE2015/200457, dated Apr. 11, 2017, 6 pages, International Bureau of WIPO, Geneva, Switzerland.
German Search Report for German Patent Application No. 10 2014 220 585.9, dated May 28, 2015, 10 pages, Muenchen, Germany, with English translation, 7 pages.
Stefan K. Gehrig, "Large-Field-of-View Stereo for Automotive Applications", Oct. 1, 2005, OMNIVIS05, Beijing, URL:http://www.fieldrobotics.org/~cgeyer/OMNIVIS05/final/Gehrig.pdf, retrieved on Jan. 28, 2016, XP055245745, pp. 1 to 8.
Weijia Feng et al., "A General Model and Calibration Method for Spherical Stereoscopic Vision", Intelligent Robots and Computer Vision, XXIX: Algorithms and Techniques, SPIE, Bellingham WA USA, vol. 8301, No. 1, Jan. 22, 2012, XP060000647, pp. 1 to 8.
Simon Thibault, "Panomorph Based Panoramic Vision Sensors", Vision Sensors and Edge Detection, Aug. 1, 2010, Sciyo, XP055218910, ISBN: 978-953-30-7098-8, pp. 1 to 28.
Partial English Translation/Summary of Chinese Office Action in Chinese Patent Application No. 201580054499.7, dated Jul. 11, 2018, 5 pages.

* cited by examiner

STEREO CAMERA FOR VEHICLES

FIELD OF THE INVENTION

The invention relates to a stereo camera for a vehicle, comprising a first camera, which has a first image sensor, and a second camera, which has a second image sensor. In addition, the invention relates to a method for controlling the exposure of such a stereo camera.

BACKGROUND INFORMATION

In order to produce driver assistance systems such as, for example, a traffic sign recognition system or a lane departure warning system, camera systems, in particular stereo cameras, are used for improved depth resolution. The term 'stereo camera' denotes two cameras each comprising a lens optical unit and an image sensor, which are mounted offset with respect to one another at a predetermined distance, for example on a windshield of the vehicle. The advantage of stereo cameras is that they can be used to measure distances.

In order to realize the aforementioned driver assistance functions, camera systems require a horizontal opening angle of approx. 50° and a vertical opening angle of approx. 30°. Future camera systems require a significantly higher opening angle for new functions such as cross-traffic detection or traffic light detection.

Camera systems having a high resolution and, at the same time, a large opening angle require image sensors with a high number of pixels of multiple megapixels, which are already standard for image photography. However, such image sensors are not suitable for automotive usage because, on the one hand, they are too insensitive due to the small pixel size and, on the other hand, they do not allow efficient processing of the large number of pixels for the elaborate image processing algorithms.

In this technical context the generic US patent specification U.S. Pat. No. 8,305,431 B1 describes a stereo camera for a vehicle having a first and a second camera which, however, have different and overlapping camera fields of view (FOV) in order to produce multi-functionality. One of these cameras is designed as a black and white camera and the other is designed as a color camera, wherein the black and white camera has an opening angle between 30° and 50°, preferably 40°, while the color camera has an opening angle between 15° and 25°, preferably 20°. Identical image sensors, in particular in terms of their resolution, are proposed for both cameras.

DE 10 2004 061998 A1 also describes a similar system of a stereo camera, which comprises a black and white camera having an opening angle of 40° as well and a color camera having an opening angle of 70°. The black and white camera has a gray-scale value image sensor with a high light sensitivity and a pixel size of 8 µm at a horizontal geometric resolution of 800 pixels. The color camera is equipped with a high-resolution color image sensor with a pixel size of 4 µm at a horizontal geometric resolution of 1600 pixels. However, the use of such a high-resolution color image sensor is contrary to an inexpensive realization of driver assistance functions.

A stereo camera is also known from US 2013/0120538 A1, the two cameras of which are equipped with different image sensors with respect to the number of pixels. In addition, lens systems for adjusting the camera fields of vision thereof are assigned to each camera. The one lens system results in an opening angle of 55° and the other lens system results in an opening angle of 80°.

In "Panomorph Based Panoramic Vision Sensors", in the publication "Vision Sensors and Edge Detection", Francisco Gallegos-Funes (ed.), ISBN: 978-953-307-098-8, InTech, Simon Thibault (2010) describes so-called "panomorph optics" having increased resolution in predefined zones of the camera field of view of the related image sensor, which constitutes a particular type of panoramic lenses. These are characterized by two parameters, namely the amount and location of the resolution within the panoramic camera field of view. The resolution constitutes a design parameter for such panomorph lenses, in order to realize a high-resolution pre-determined zone, i.e. the camera field of view is divided into different zones which have different resolutions. A panomorph lens is therefore described, the central zone of which has a resolution which is twice that of the resolution at the periphery, as is explained with reference to FIGS. 8 and 9.

Figure 8:
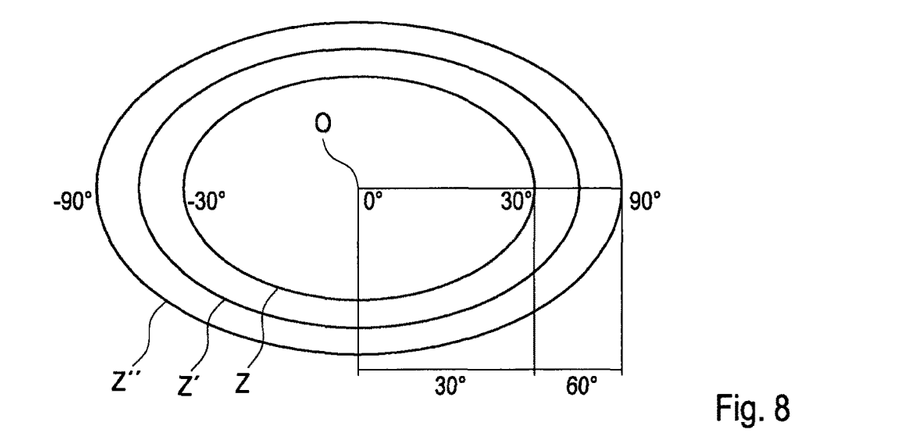
FIG. 8 shows a camera field of vision of a panomorph lens with a central region of increased resolution with respect to the peripheral region.
Figure 9:
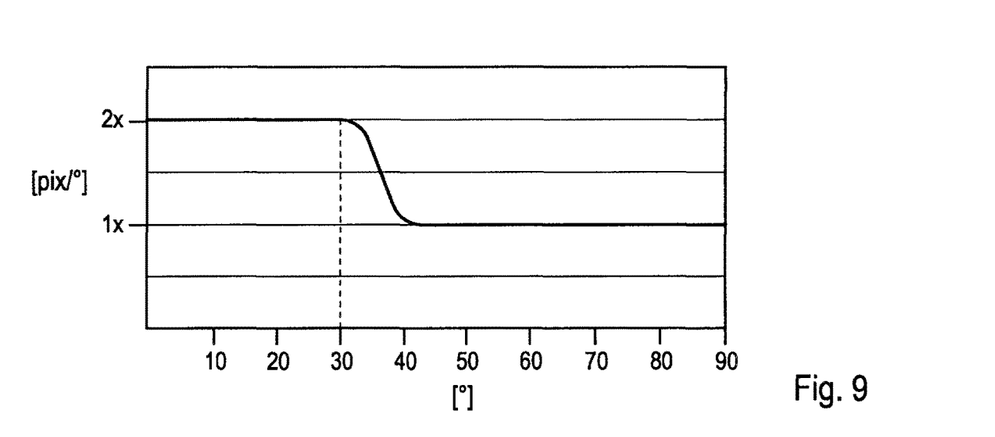
FIG. 9 shows a diagram with the resolution progression of the panomorph lens according to FIG. 8 as a function of the horizontal opening angle.

FIG. 8 shows a camera viewing window having an opening angle of +/−90° about an optical axis O with a high-resolution central region Z corresponding to an opening angle of +/−30° and peripheral zones Z' and Z" with a lower resolution. FIG. 9 shows the graph of the resolution as a function of the opening angle, wherein the central region Z has double the resolution of the region Z" lying outside the central region. These FIGS. 8 and 9 also show a transition region Z' between the central region Z and the range Z", which extends over an angular range of 10°.

The author of the aforementioned article also explains the application of an image sensor having a panomorph lens for providing the necessary image information for a driver assistance system.

SUMMARY OF THE INVENTION

Starting from the above prior art, it is an object of at least one embodiment of the invention to create a stereo camera of the type indicated above which is economically feasible and, at the same time, meets the requirements with regard to an increased resolution, in order to realize driver assistance systems. In addition, it is an object of another embodiment of the invention to indicate a method for controlling the exposure of such a stereo camera.

The above object can be achieved according to the invention in a stereo camera for a vehicle, comprising a first camera, which has a first image sensor and the camera field of vision of which has a first opening angle, and a second camera, which has a second image sensor and the camera field of vision of which has a second opening angle, wherein the second opening angle is greater than the first opening angle. According to the invention, the camera is characterized in that the first camera has a first lens optical unit and the second camera has a second lens optical unit, wherein both the first lens optical unit and the second lens optical unit are designed with an angular resolution that is higher in a central region of the camera field of vision lying in the angular range around the optical axis than outside of the central region, and the first camera and the second camera are arranged in relation to each other in such a way that the camera fields of vision thereof overlap.

This stereo camera according to the invention is characterized in that a lens optical unit is used for both cameras, which lens optical unit has, in each case, a higher resolution in the central region than outside of said central region. Such a stereo camera can be produced inexpensively since the relevant lens systems are available as commercially available products, e.g. from the company ImmerVision.

Due to the use of panomorph lens optical units the first image sensor and the second image sensor are designed with identical pixel densities, wherein the two image sensors each have a size which is adapted to the opening angle. In accordance with the larger opening angle, the related image sensor also has a larger area compared with the image sensor of the camera having the smaller camera field of vision.

It is particularly advantageous according to another configuration of the invention, if the first lens optical unit and the second lens optical unit are, in each case, designed with double the resolution in the central region compared with outside of the central region.

The second abovementioned object can be achieved according to the invention in a method for controlling the exposure of a stereo camera for a vehicle, comprising a first camera, which has a first image sensor and the camera field of vision of which has a first opening angle, and a second camera, which has a second image sensor and the camera field of vision of which has a second opening angle, wherein the second opening angle is greater in the horizontal direction than the first opening angle. According to the invention in accordance with a first solution, the method is characterized in that a first lens optical unit is provided for the first camera and a second lens optical unit is provided for the second camera, wherein both the first lens optical unit and the second lens optical unit are designed with an angular resolution that is higher in a central region of the camera field of vision lying in the angular range around the optical axis than outside of the central region, the first camera and the second camera are arranged in relation to each other in such a way that the camera fields of vision thereof overlap symmetrically with respect to the optical axis, and the image sensor pixels of the first image sensor and the second image sensor are exposed and read out column by column in that, following the start of exposure of an image of a scene on the larger (e.g. second) image sensor, the exposure of the image of the scene on the smaller (e.g. first) image sensor starts when the exposure on the larger image sensor reaches the portion of the image of the scene that is also imaged onto the first column of the smaller image sensor.

In the case of this first-mentioned solution according to the invention, the camera field of vision of the one camera is merely extended with respect to the other in the horizontal direction, wherein in order to control the exposure the two image sensors are exposed and read out column by column.

A second solution according to the invention is characterized in that a first lens optical unit is provided for the first camera and a second lens optical unit is provided for the second camera, wherein both the first lens optical unit and the second lens optical unit are designed with an angular resolution that is higher in a central region of the camera field of vision lying in the angular range around the optical axis than outside of the central region, the first camera and the second camera are arranged in relation to each other in such a way that the camera fields of vision thereof overlap symmetrically with respect to the optical axis, and the image sensor pixels of the first image sensor and the second image sensor are exposed and read out line by line in that, following the start of exposure of an image of a scene on the larger (e.g. second) image sensor, the exposure of the image of the scene on the smaller (e.g. first) image sensor starts when the exposure on the larger image sensor reaches the portion of the image of the scene that is also imaged onto the first line of the smaller image sensor.

In the case of this second-mentioned solution according to the invention, the camera field of vision of the one camera is merely extended compared to the other in the vertical direction, wherein in order to control the exposure the two image sensors are exposed and read out row by row.

A third solution according to the invention is characterized in that a first lens optical unit is provided for the first camera and a second lens optical unit is provided for the second camera, wherein both the first lens optical unit and the second lens optical unit are designed with an angular resolution that is higher in a central region of the camera field of vision lying in the angular range around the optical axis than outside of the central region, the first camera and the second camera are arranged in relation to each other in such a way that the camera fields of vision thereof overlap symmetrically with respect to the optical axis, and the image sensor pixels of the first image sensor and the second image sensor are exposed and read out line by line in that, following the start of exposure of an image of a scene on the larger (e.g. second) image sensor, the exposure of the image of the scene on the smaller (e.g. first) image sensor starts when the exposure of the larger image sensor reaches the portion of the image of the scene that is also imaged onto the first line of the smaller image sensor, wherein virtual columns are generated, respectively in each case, for the smaller image sensor at the edge side in the horizontal direction until the number of columns matches the number of columns of the larger image sensor.

In the case of this third-mentioned solution according to the invention, the camera field of vision of the one camera is extended with respect to the other both in the horizontal and the vertical directions, wherein in order to control the exposure the two image sensors are exposed and read out row by row and virtual columns are generated and inserted for adjustment purposes in the horizontal direction for the smaller image sensor.

The stereo camera according to the invention can be used for driver assistance systems in vehicles.

BRIEF DESCRIPTION OF THE DRAWINGS

The stereo camera according to the invention and the associated method according to the invention for controlling the exposure of such a stereo camera will be explained in more detail below with reference to the appended figures, wherein.

DETAILED DESCRIPTION OF EXAMPLE EMBODIMENTS OF THE INVENTION

Figure 1:
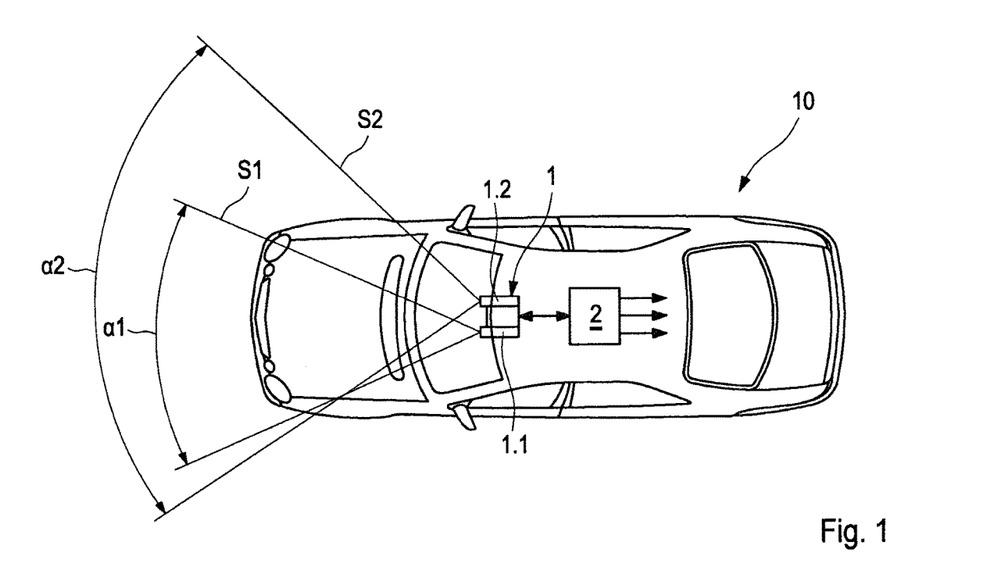
FIG. 1 shows a schematic representation of a stereo camera according to the invention in the region of a windshield of a vehicle.

The vehicle 10 shown in FIG. 1 comprises a driver assistance system with a stereo camera 1 arranged behind a windshield of the vehicle 10 as well as a control and evaluation unit 2, wherein the stereo camera 1 has a first camera 1.1 and a second camera 1.2 and, when viewed in the direction of travel, the first camera 1.1 constitutes a left camera and the second camera 1.2 constitutes a right camera. The image data of the stereo camera 1 are evaluated by the control and evaluation unit 2. A driver assistance function of the driver assistance system is executed as a function of the evaluation result.

The left camera 1.1 has a camera field of vision S1 with a horizontal opening angle $\alpha 1$, for example of 50°, while the right camera 1.2 has a camera field of vision S2 with a greater horizontal opening angle $\alpha 2$, for example of 90°.

Figure 2:
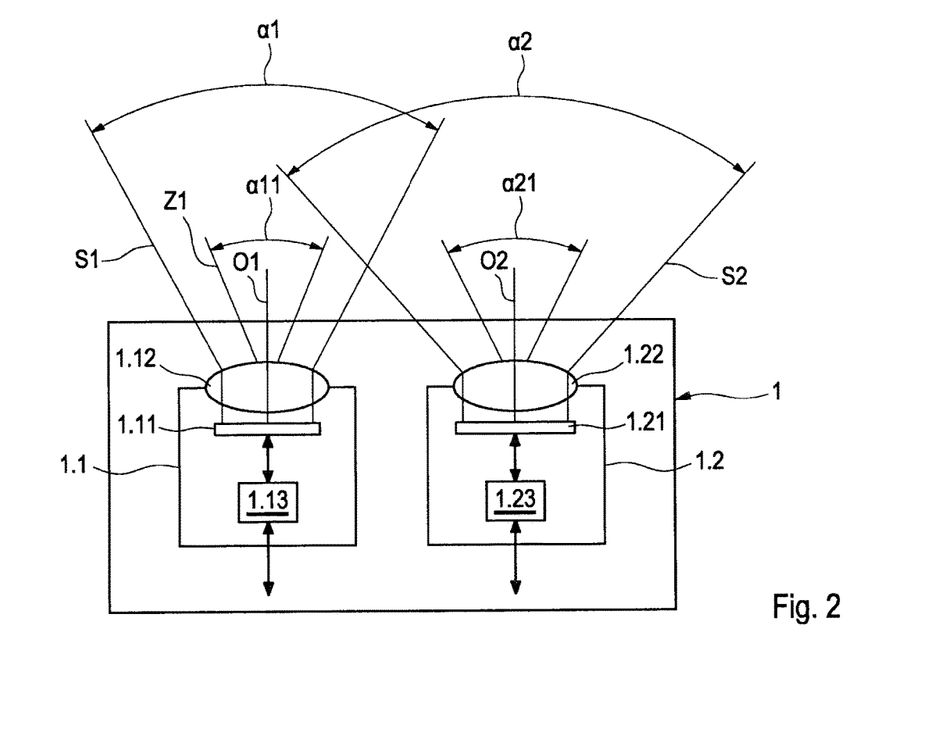
FIG. 2 shows a schematic representation of the design configuration of the stereo camera having a first camera and a second camera according to FIG. 1.

FIG. 2 shows the design configuration of the stereo camera 1 with the left camera 1.1 and the right camera 1.2. The left camera 1.1 comprises a first lens optical unit 1.12 as well as a first image sensor 1.11 assigned to this lens optical unit 1.12, which first image sensor is controlled by an image evaluation unit 1.13. The right camera 1.2 has a similar overall construction and consists of a second lens optical unit 1.22 having a second image sensor 1.21, which second image sensor is controlled by an image evaluation unit 1.23.

At least one panomorph lens with properties in accordance with FIGS. 8 and 9 is used for the first lens optical unit 1.12 and the second lens optical unit 1.22, the properties of which have already been explained in the introduction to the specification. This lens according to FIG. 8 has a central region Z which surrounds the optical axis O, in which central region said lens has a higher resolution than the two regions Z' and Z" which surround the central region in an annular form, which regions lie outside of this central region Z. These regions Z, Z' and Z" have an elliptical form, wherein the central region Z has a horizontal opening angle of 60° and the entire opening angle of this lens, which corresponds to the camera field of vision, has a value of 180°. FIG. 9 shows the progression of the resolution starting from the optical axis O up to the edge area, according to which the resolution in the central region Z, i.e. up to the angle of 30° is double the resolution of the region at an angle greater than 40°, which corresponds to the region Z". The angular range from 30° to 40° constitutes a transition region Z' between the central region Z and the outermost region Z", in which transition region the resolution steadily turns from the higher value into the lower value.

Figure 3:
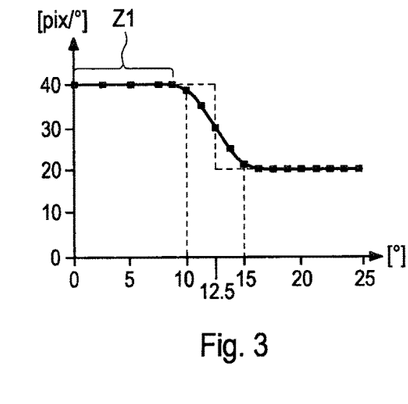
FIG. 3 shows a diagram with the resolution progression of the first camera of the stereo camera according to FIG. 2 as a function of the horizontal opening angle.
Figure 4:
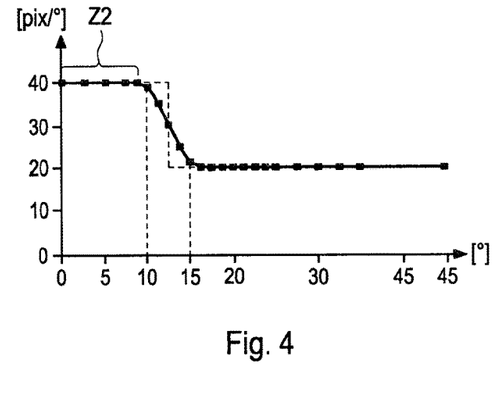
FIG. 4 shows a diagram with the resolution progression of the second camera of the stereo camera according to FIG. 2 as a function of the horizontal opening angle.

The first lens optical unit 1.12 and the second lens optical unit 1.22 of the left camera 1.1 and right camera 1.2 have a corresponding property which is shown in FIGS. 3 and 4. Thus, according to FIG. 2, the first lens optical unit 1.12 of the left camera 1.1 of the stereo camera 1 has a central region Z1 with an opening angle of all, while the second lens optical unit 1.22 of the right camera 1.2 of the stereo camera 1 has a central region Z2 with a greater opening angle $\alpha 21$. These two central regions Z1 and Z2 can, in accordance with FIG. 8, have an elliptical or rotationally symmetrical design, i.e. have a circular design. The joining regions around these central regions Z1 and Z2 are executed accordingly.

FIG. 3 shows the progression of the horizontal resolution via the camera viewing window S1 of the left camera 1.1, while FIG. 4 shows the progression of the horizontal resolution via the camera viewing window S2 of the right camera 1.2.

In accordance with FIG. 3, the opening angle $\alpha 11$ of the central region Z1 of the first lens optical unit 1.12 of the first camera 1.1 is 20°, in which central region the resolution is constantly 40 pix/°. An angular range of 5° joins this central region Z1 as a transition region, in which transition region the resolution drops from 40 pix/° to 20 pix/° and remains constant up to the edge at an angle value of 25°, corresponding to an opening angle of 50°. In this central region Z1 which has a relatively narrow opening angle of 20° there exists a high resolution, which is required for detecting objects in the distance.

According to FIG. 4 the opening angle $\alpha 12$ of the central region Z2 of the second lens optical unit 1.22 of the second camera 1.2, corresponding to the first lens optical unit 1.12, is 20° as well, in which central region the resolution is constantly 40 pix/° as well. An angular range of 5° joins this central region Z2 as a transition region, in which transition region the resolution drops from 40 pix/° to 20 pix/° and remains constant up to the edge at a value of 45°, corresponding to an opening angle of 90°.

In the case of such a stereo camera 1 having the properties in accordance with FIGS. 3 and 4, the stereo effect can be used up to an opening angle of 50°.

Figure 5:
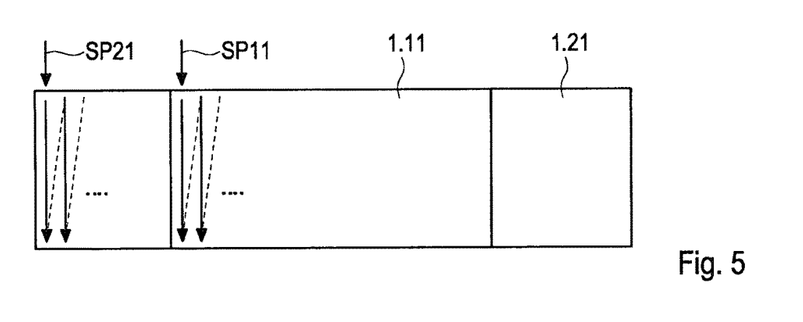
FIG. 5 shows a schematic representation of the exposure diagram of the image sensors of the first camera and the second camera of a stereo camera according to the invention in the case of a horizontal extension or orientation of the opening angle of the second camera with respect to the first camera.

The image sensors 1.11 and 1.21 of the left camera 1.1 and the right camera 1.2 have different sizes, each of which are adjusted to the camera fields of vision S1 and S2, but which each have the same pixel density. Due to the larger field of vision S2 of the right camera 1.2 compared with the field of vision S1 of the left camera 1.1, the second image sensor 1.21 of the right camera 1.2 is greater in its horizontal extent than the first image sensor 1.11 of the left camera 1.1. In this case, the two cameras 1.1 and 1.2 are aligned in relation to one another in such a way that the camera fields of vision S1 and S2 overlap symmetrically, as shown in FIG. 5.

The larger image sensor 1.21 would, in the case of a merely horizontal extension of the opening angle $\alpha 2$ of the right camera 1.2 to 90° compared with an opening angle of 50° of the left camera 1.1, only have to increase by approx. 50.% with respect to the number of pixels, although the opening angle is almost doubled.

The transition region from the high-resolution central region Z1 or Z2 into the low-resolution region renders rectification of the images in order to calculate a stereo depth image more difficult. To circumvent this difficulty, it is possible to displace the transition region so far to the right, i.e. in the direction of higher angle values so that this transition region only has an effect in the right camera 1.2 with the larger opening angle α2.

In order to achieve an extremely accurate stereo depth chart, synchronicity must be guaranteed during exposing and reading out of the image sensor pixels of the two image sensors 1.11 and 1.21. This does not constitute a problem, if image sensors which operate according to the "global shutter principle" are used, since all of the image sensor pixels are exposed and read out at the same time.

However, it is possible to proceed according to the so-called "rolling shutter principle", in that synchronicity is achieved first of all in the case of the two image sensors 1.11 and 1.21 by reading these out column by column. FIG. 5 outlines this procedure where the first column SP21 of the larger image sensor 1.21 is exposed and read out and the process of exposing and reading out the smaller image sensor 1.11 is not started until the exposure process of the larger image sensor 1.21 has reached the portion of the image of the scene that is also imaged on the first column SP11 of the smaller image sensor 1.11.

A stereo camera 1 comprising a left camera 1.1 and a right camera 1.2 is outlined in FIGS. 1 to 4, in which the opening angle α2 of the right camera 1.2 is extended with respect to the opening angle α1 of the left camera 1.1 in the horizontal direction. Accordingly, it is alternatively possible to extend the opening angle of the right camera 1.2 compared with the opening angle of the left camera 1.1 in the vertical direction. In this case as well, the two lens optical units 1.12 and 1.22 of the left camera 1.1 and the right camera 1.2 have the properties described in connection with FIGS. 3 and 4. The two cameras 1.1 and 1.2 are thereby aligned in relation to one another in such a way that the camera fields of vision S1 and S2 overlap symmetrically, as shown in FIG. 6.

Figure 6:
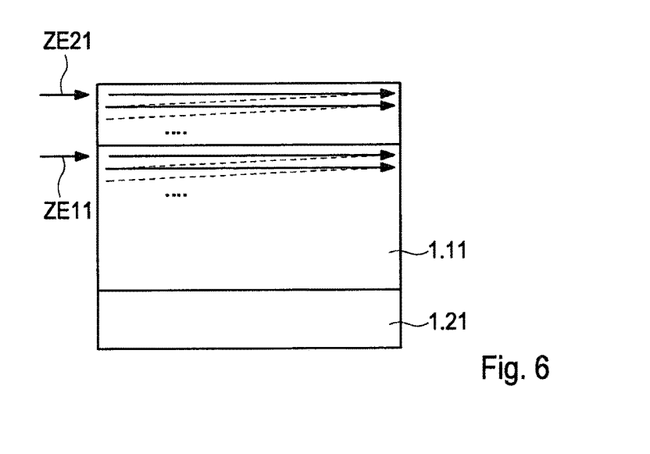
FIG. 6 shows a schematic representation of the exposure diagram of the image sensors of the first camera and the second camera of a stereo camera according to the invention in the case of a vertical extension or orientation of the opening angle of the second camera with respect to the first camera.

The two image sensors 1.11 and 1.21 of such a stereo camera 1 are exposed line by line in accordance with this FIG. 6, in that the exposure and the reading out starts first of all with the first line ZE21 of the larger image sensor 1.21 and then the exposure and the reading out of the smaller image sensor 1.11 does not start until the exposure process of the larger image sensor 1.21 has reached the portion of the image of the scene that is also imaged on the first line ZE11 of the smaller image sensor 1.11.

Figure 7:
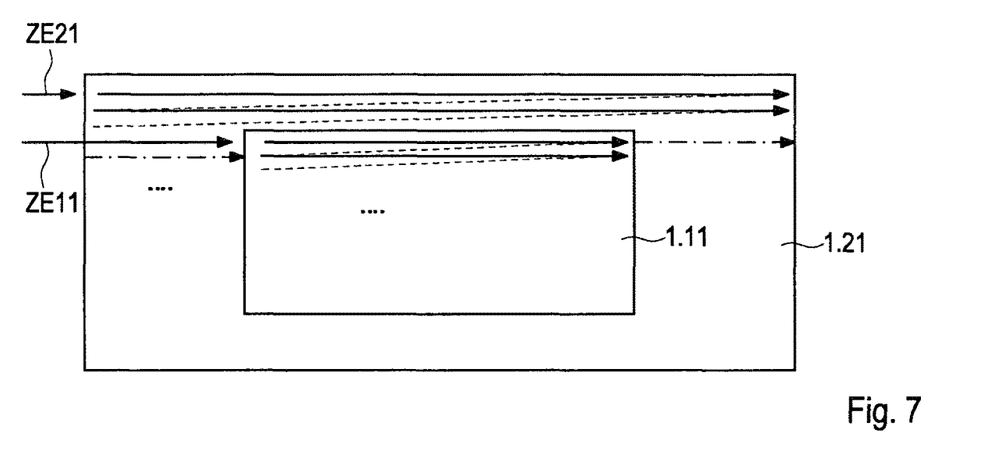
FIG. 7 shows a schematic representation of the exposure diagram of the image sensors of the first camera and the second camera of a stereo camera according to the invention in the case of a horizontal and a vertical extension or orientation of the opening angle of the second camera with respect to the first camera.

The opening angle of the right camera 1.2 can also be extended with respect to the opening angle of the left camera 1.1 in both the horizontal and vertical directions. This results in the second image sensor 1.21 being larger than the first image sensor 1.11 both in the horizontal and the vertical directions. In this case as well, the lens optical unit 1.12 of the left camera 1.1 and the lens optical unit 1.22 of the right camera 1.2 have the properties described in connection with FIGS. 3 and 4. In this case, the two cameras 1.1 and 1.2 are aligned in relation to one another in such a way that the camera fields of vision S1 and S2 overlap symmetrically, as shown in FIG. 7.

Establishing synchronicity during the exposure and reading out of such image sensors 1.1 and 1.2 is more complex than in the case of the embodiment examples previously outlined.

First of all, the exposing and reading out process starts with the first line ZE21 of the larger image sensor 1.21 and then the exposure and reading out of the smaller image sensor 1.11 does not start until the exposure process of the larger image sensor 1.21 has reached the portion of the image of the scene that is also imaged on the first line ZE11 of the smaller image sensor 1.11. Furthermore, to ensure synchronicity, a pause corresponding to the number of read-out clock pulses of the superfluous or extra pixels in one line of the larger image sensor 1.21 is inserted for each line of the smaller image sensor 1.11. This is achieved in that for the smaller image sensor 1.11, a corresponding number of virtual columns are inserted for which columns the pixel clock can continue to run, without the pixels of these virtual columns of the smaller image sensor 1.11 having to be processed. As a result, it is possible to wait for the start of exposure of the following line and the simultaneous starting of the line-by-line exposure can be ensured.

REFERENCE NUMERALS

1 Stereo camera
1.1 First camera of the stereo camera 1
1.11 First image sensor of the first camera 1.1
1.12 First lens optical unit of the first camera 1.1
1.13 Image evaluation unit of the first camera 1.1
1.2 Second camera of the stereo camera 1
1.21 Second image sensor of the second camera 1.2
1.22 Second lens optical unit of the second camera 1.2
1.23 Image evaluation unit of the second camera 1.2
2 Control and evaluation unit
10 Vehicle
O Optical axis
O1 Optical axis of the first camera 1.1
O2 Optical axis of the second camera 1.2
S1 Camera field of vision of the first camera 1.1
S2 Camera field of vision of the second camera 1.2
SP11 First column of the first image sensor 1.11
SP21 First column of the second image sensor 1.21
Z Central region of a panomorph lens
Z' A region of a panomorph lens enclosing the central region
Z" A region of a panomorph lens enclosing the central region
Z1 Central region of the first lens optical unit 1.12
Z2 Central region of the second lens optical unit 1.22
ZE11 First line of the first image sensor 1.11
ZE21 First line of the second image sensor 1.21
α1 Opening angle of the camera field of vision S1
α11 Opening angle of the central region Z1
α2 Opening angle of the camera field of vision S2
α21 Opening angle of the central region Z2

The invention claimed is:

1. A stereo camera arrangement for a vehicle, comprising a first camera and a second camera, wherein:

the first camera comprises a first image sensor, a first lens optical unit that images a first portion of a scene within a first field of vision onto the first image sensor, and a first evaluation unit;

the second camera comprises a second image sensor, a second lens optical unit that images a second portion of the scene within a second field of vision onto the second image sensor, and a second evaluation unit;

the first image sensor and the second image sensor each respectively have image sensor pixels arranged in successive linear groups of pixels;

the first field of vision is defined by a first opening angle, and the second field of vision is defined by a second opening angle that is greater than the first opening angle in at least one selected direction;

the first lens optical unit and the second lens optical unit each respectively have a respective angular resolution that is higher in a respective central region of the respective field of vision lying in a respective central angular range around a respective optical axis of the respective lens optical unit than in a respective other region outside of the respective central region;

the first and second cameras are arranged relative to one another so that the first and second fields of vision overlap one another; and the first evaluation unit is configured to control an exposing and reading out of the first image sensor and the second evaluation unit is configured to control an exposing and reading out of the second image sensor, in relation to one another, comprising exposing and reading out the linear groups of pixels of the second image sensor group-by-group beginning with a first linear group of pixels and proceeding to subsequent linear groups of pixels of the second image sensor one after another, and exposing and reading out the linear groups of pixels of the first image sensor group-by-group beginning with a first linear group of pixels and proceeding to subsequent linear groups of pixels of the first image sensor one after another, wherein the exposing and reading out of the linear groups of pixels of the first image sensor begins with the first linear group of pixels of the first image sensor after the exposing and reading out of the linear groups of pixels of the second image sensor has begun and has progressed to one of the subsequent linear groups of pixels of the second image sensor on which is imaged a linear portion of the scene that is also imaged on the first linear group of pixels of the first image sensor.

2. The stereo camera arrangement according to claim 1, wherein the first and second cameras are arranged relative to one another so that the first and second fields of vision overlap one another symmetrically about the respective optical axes.

3. The stereo camera arrangement according to claim 1, wherein the first and second image sensors both have a same pixel density as one another.

4. The stereo camera arrangement according to claim 3, wherein the first image sensor has a first size, the second image sensor has a second size, the first size is relatively smaller and adapted to the first opening angle and the second size is relatively larger and adapted to the second opening angle.

5. The stereo camera arrangement according to claim 1, wherein the respective angular resolution in the central region of the field of vision of each respective one of the first and second lens optical units is twice the respective angular resolution in the other region outside of the central region.

6. The stereo camera arrangement according to claim 1, wherein:

the at least one selected direction is a vertical direction;

the second opening angle is greater than the first opening angle in the vertical direction;

each one of the linear groups of pixels is a horizontal line of pixels; and the first and second evaluation units are configured to control the exposing and reading out of the first and second image sensors by exposing and reading out the horizontal lines of pixels of the second image sensor line-by-line beginning with a first line of pixels and proceeding to subsequent lines of pixels of the second image sensor one after another, and exposing and reading out the horizontal lines of pixels of the first image sensor line-by-line beginning with a first line of pixels and proceeding to subsequent lines of pixels of the first image sensor one after another, wherein the exposing and reading out of the horizontal lines of pixels of the first image sensor begins with the first line of pixels of the first image sensor after the exposing and reading out of the horizontal lines of pixels of the second image sensor has begun and has progressed to one of the subsequent lines of pixels of the second image sensor on which is imaged a horizontal line portion of the scene that is also imaged on the first line of pixels of the first image sensor.

7. The stereo camera arrangement according to claim 1, wherein:

the at least one selected direction is a horizontal direction;

the second opening angle is greater than the first opening angle in the horizontal direction;

each one of the linear groups of pixels is a vertical column of pixels; and the first and second evaluation units are configured to control the exposing and reading out of the first and second image sensors by exposing and reading out the vertical columns of pixels of the second image sensor column-by-column beginning with a first column of pixels and proceeding to subsequent columns of pixels of the second image sensor one after another, and exposing and reading out the vertical columns of pixels of the first image sensor column-by-column beginning with a first column of pixels and proceeding to subsequent columns of pixels of the first image sensor one after another, wherein the exposing and reading out of the vertical columns of pixels of the first image sensor begins with the first column of pixels of the first image sensor after the exposing and reading out of the vertical columns of pixels of the second image sensor has begun and has progressed to one of the subsequent columns of pixels of the second image sensor on which is imaged a vertical column portion of the scene that is also imaged on the first column of pixels of the first image sensor.

8. The stereo camera arrangement according to claim 1, wherein:

the at least one selected direction includes a horizontal direction and a vertical direction;

the second opening angle is greater than the first opening angle in both the horizontal direction and the vertical direction;

each one of the linear groups of pixels is a horizontal line of pixels; and the first and second evaluation units are configured to control the exposing and reading out of the first and second image sensors by exposing and reading out the horizontal lines of pixels of the second image sensor line-by-line beginning with a first line of pixels and proceeding to subsequent lines of pixels of the second image sensor one after another, exposing and reading out the horizontal lines of pixels of the first image sensor line-by-line beginning with a first line of pixels and proceeding to subsequent lines of pixels of the first image sensor one after another, wherein the exposing and reading out of the horizontal lines of pixels of the first image sensor begins with the first line of pixels of the first image sensor after the exposing and reading out of the horizontal lines of pixels of the second image sensor has begun and has progressed to one of the subsequent lines of pixels of the second image sensor on which is imaged a horizontal line portion of the scene that is also imaged on the first line of pixels of the first image sensor, and generating virtual columns for the first image sensor at edge sides thereof in the horizontal direction until a total number of the virtual columns plus actual columns of the pixels of the first image sensor matches a number of actual columns of the pixels of the second image sensor.

9. The stereo camera arrangement according to claim 8, wherein the first and second evaluation units are configured so that virtual pixels of the virtual columns represent a pause in the exposing and reading out of the horizontal lines of pixels of the first image sensor synchronized with the exposing and reading out of the horizontal lines of pixels of the second image sensor.

10. A vehicle comprising a driver assistance system equipped with the stereo camera arrangement according to claim 1.

11. A method of operating a stereo camera arrangement for a vehicle, wherein:
the stereo camera arrangement comprises a first camera and a second camera;
the first camera comprises a first image sensor, a first lens optical unit that images a first portion of a scene within a first field of vision onto the first image sensor, and a first evaluation unit;
the second camera comprises a second image sensor, a second lens optical unit that images a second portion of the scene within a second field of vision onto the second image sensor, and a second evaluation unit;
the first image sensor and the second image sensor each respectively have image sensor pixels arranged in successive linear groups of pixels;
the first field of vision is defined by a first opening angle, and the second field of vision is defined by a second opening angle that is greater than the first opening angle in at least one selected direction;
the first lens optical unit and the second lens optical unit each respectively have a respective angular resolution that is higher in a respective central region of the respective field of vision lying in a respective central angular range around a respective optical axis of the respective lens optical unit than in a respective other region outside of the respective central region;
the first and second cameras are arranged relative to one another so that the first and second fields of vision overlap one another;
the first evaluation unit is configured to control an exposing and reading out of the first image sensor and the second evaluation unit is configured to control an exposing and reading out of the second image sensor, in relation to one another; and
the method comprises, under control by the first and second evaluation units:
exposing and reading out the linear groups of pixels of the second image sensor group-by-group beginning with a first linear group of pixels and proceeding to subsequent linear groups of pixels of the second image sensor one after another; and
exposing and reading out the linear groups of pixels of the first image sensor group-by-group beginning with a first linear group of pixels and proceeding to subsequent linear groups of pixels of the first image sensor one after another, wherein the exposing and reading out of the linear groups of pixels of the first image sensor begins with the first linear group of pixels of the first image sensor after the exposing and reading out of the linear groups of pixels of the second image sensor has begun and has progressed to one of the subsequent linear groups of pixels of the second image sensor on which is imaged a linear portion of the scene that is also imaged on the first linear group of pixels of the first image sensor.

12. The method according to claim 11, wherein the first and second cameras are arranged relative to one another so that the first and second fields of vision overlap one another symmetrically about the respective optical axes.

13. The method according to claim 11, wherein the first and second image sensors both have a same pixel density as one another.

14. The method according to claim 13, wherein the first image sensor has a first size, the second image sensor has a second size, the first size is relatively smaller and adapted to the first opening angle and the second size is relatively larger and adapted to the second opening angle.

15. The method according to claim 11, wherein the respective angular resolution in the central region of the field of vision of each respective one of the first and second lens optical units is twice the respective angular resolution in the other region outside of the central region.

16. The method according to claim 11, wherein:
the at least one selected direction is a vertical direction;
the second opening angle is greater than the first opening angle in the vertical direction;
each one of the linear groups of pixels is a horizontal line of pixels; and
the exposing and reading out of the first and second image sensors comprises exposing and reading out the horizontal lines of pixels of the second image sensor line-by-line beginning with a first line of pixels and proceeding to subsequent lines of pixels of the second image sensor one after another, and exposing and reading out the horizontal lines of pixels of the first image sensor line-by-line beginning with a first line of pixels and proceeding to subsequent lines of pixels of the first image sensor one after another, wherein the exposing and reading out of the horizontal lines of pixels of the first image sensor begins with the first line of pixels of the first image sensor after the exposing and reading out of the horizontal lines of pixels of the second image sensor has begun and has progressed to one of the subsequent lines of pixels of the second image sensor on which is imaged a horizontal line portion of the scene that is also imaged on the first line of pixels of the first image sensor.

17. The method according to claim 11, wherein:
the at least one selected direction is a horizontal direction;
the second opening angle is greater than the first opening angle in the horizontal direction;
each one of the linear groups of pixels is a vertical column of pixels; and
the exposing and reading out of the first and second image sensors comprises exposing and reading out the vertical columns of pixels of the second image sensor column-by-column beginning with a first column of pixels and proceeding to subsequent columns of pixels of the second image sensor one after another, and exposing and reading out the vertical columns of pixels of the first image sensor column-by-column beginning with a first column of pixels and proceeding to subsequent columns of pixels of the first image sensor one after another, wherein the exposing and reading out of the vertical columns of pixels of the first image sensor begins with the first column of pixels of the first image sensor after the exposing and reading out of the vertical columns of pixels of the second image sensor has begun and has progressed to one of the subsequent columns of pixels of the second image sensor on which is imaged a vertical column portion of the scene that is also imaged on the first column of pixels of the first image sensor.

18. The method according to claim 11, wherein:

the at least one selected direction includes a horizontal direction and a vertical direction;

the second opening angle is greater than the first opening angle in both the horizontal direction and the vertical direction;

each one of the linear groups of pixels is a horizontal line of pixels; and the exposing and reading out of the first and second image sensors comprises exposing and reading out the horizontal lines of pixels of the second image sensor line-by-line beginning with a first line of pixels and proceeding to subsequent lines of pixels of the second image sensor one after another, exposing and reading out the horizontal lines of pixels of the first image sensor line-by-line beginning with a first line of pixels and proceeding to subsequent lines of pixels of the first image sensor one after another, wherein the exposing and reading out of the horizontal lines of pixels of the first image sensor begins with the first line of pixels of the first image sensor after the exposing and reading out of the horizontal lines of pixels of the second image sensor has begun and has progressed to one of the subsequent lines of pixels of the second image sensor on which is imaged a horizontal line portion of the scene that is also imaged on the first line of pixels of the first image sensor, and generating virtual columns for the first image sensor at edge sides thereof in the horizontal direction until a total number of the virtual columns plus actual columns of the pixels of the first image sensor matches a number of actual columns of the pixels of the second image sensor.

19. The method according to claim 18, wherein virtual pixels of the virtual columns represent a pause in the exposing and reading out of the horizontal lines of pixels of the first image sensor synchronized with the exposing and reading out of the horizontal lines of pixels of the second image sensor.

* * * * *